Dec. 22, 1964 W. F. SINDELAR 3,162,250
TORQUE CONTROL MEANS FOR POWER TOOLS
Filed Dec. 14, 1961 8 Sheets-Sheet 1
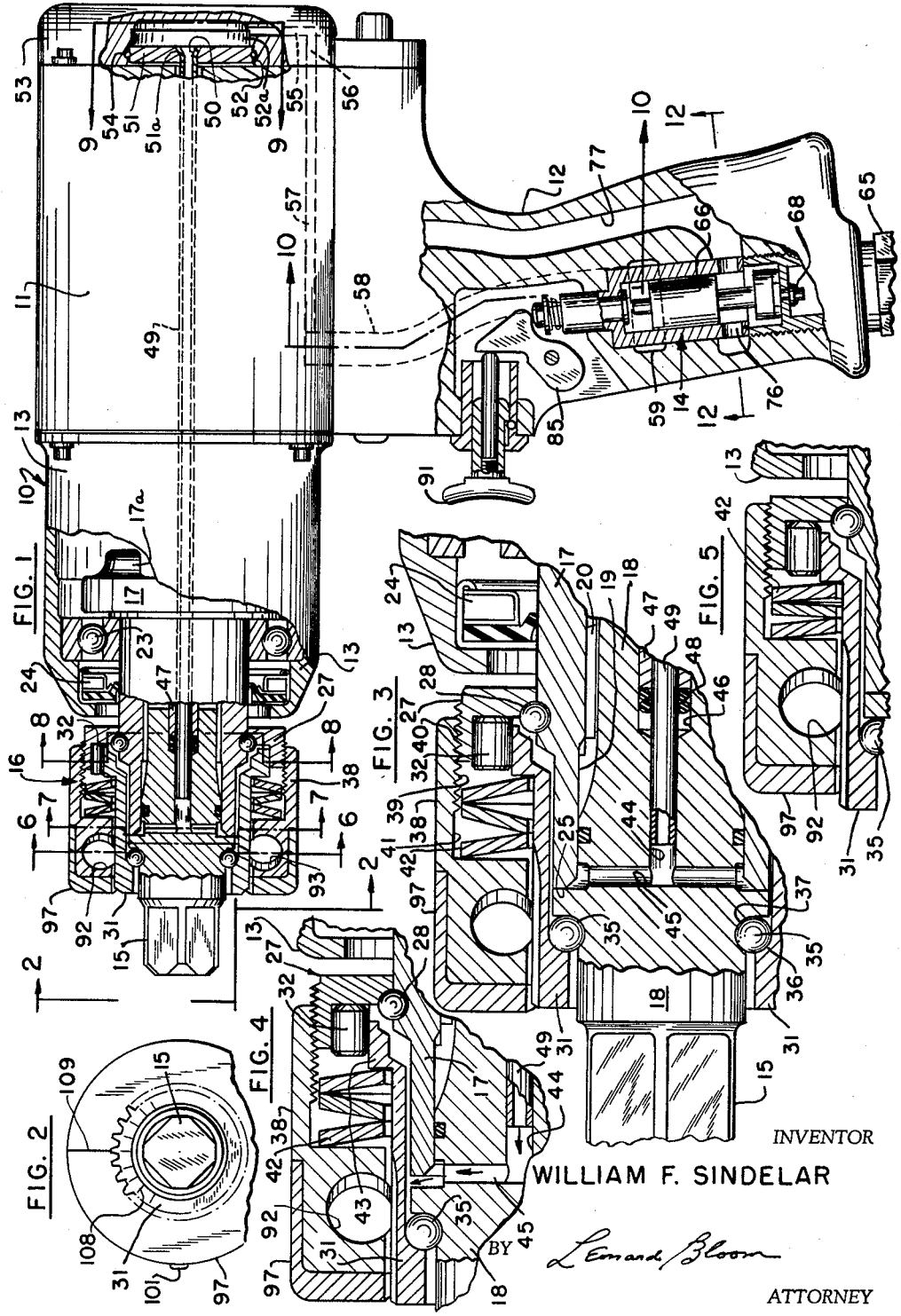
INVENTOR
WILLIAM F. SINDELAR
BY Leonard Bloom
ATTORNEY Dec. 22, 1964 W. F. SINDELAR 3,162,250
TORQUE CONTROL MEANS FOR POWER TOOLS
Filed Dec. 14, 1961 8 Sheets-Sheet 2
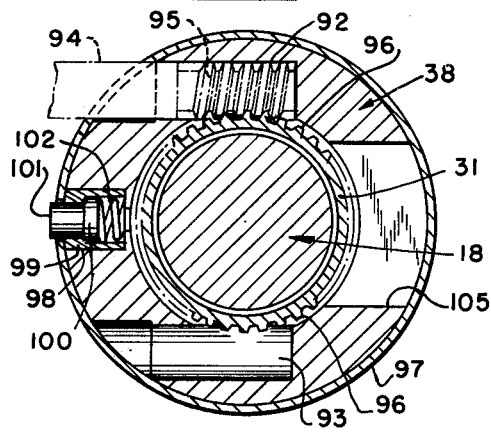
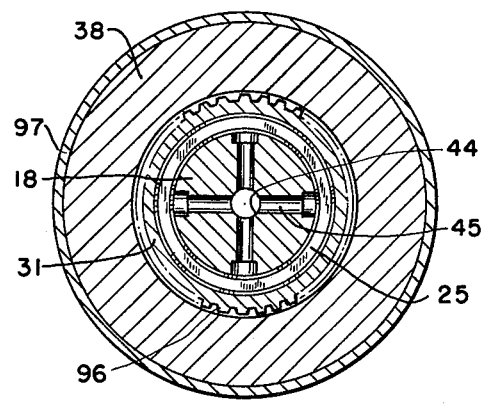
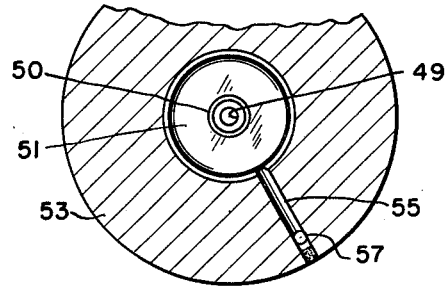
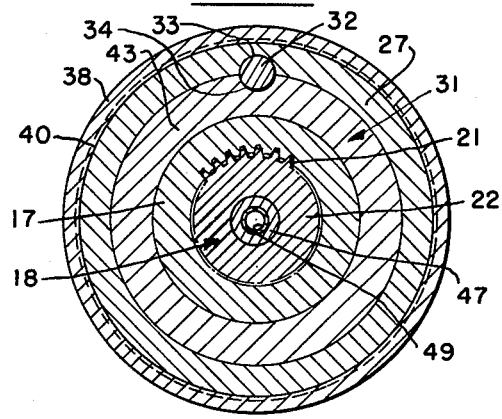
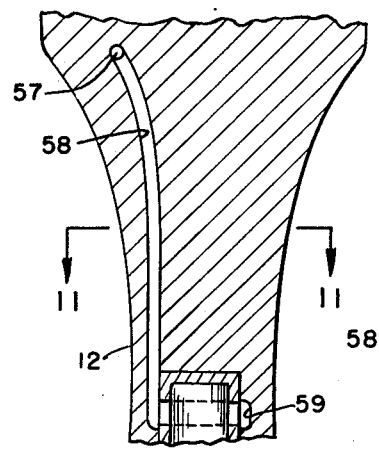
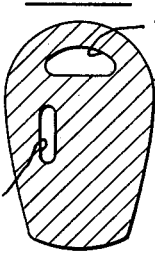
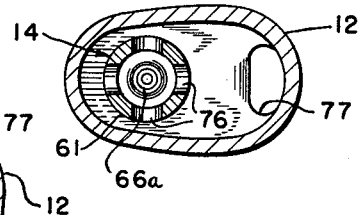
INVENTOR
WILLIAM F. SINDELAR
BY *Leonard Bloom*
ATTORNEY

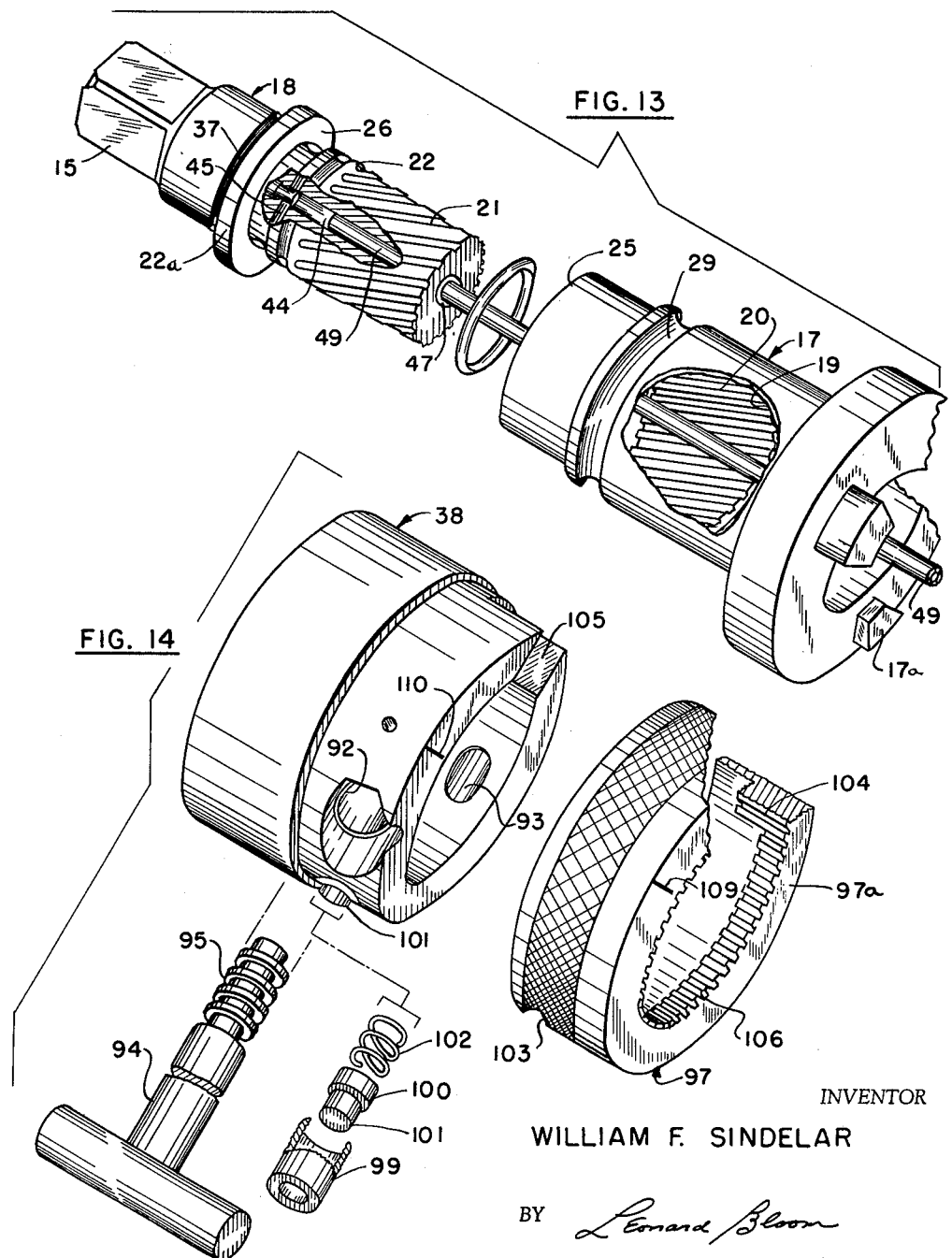

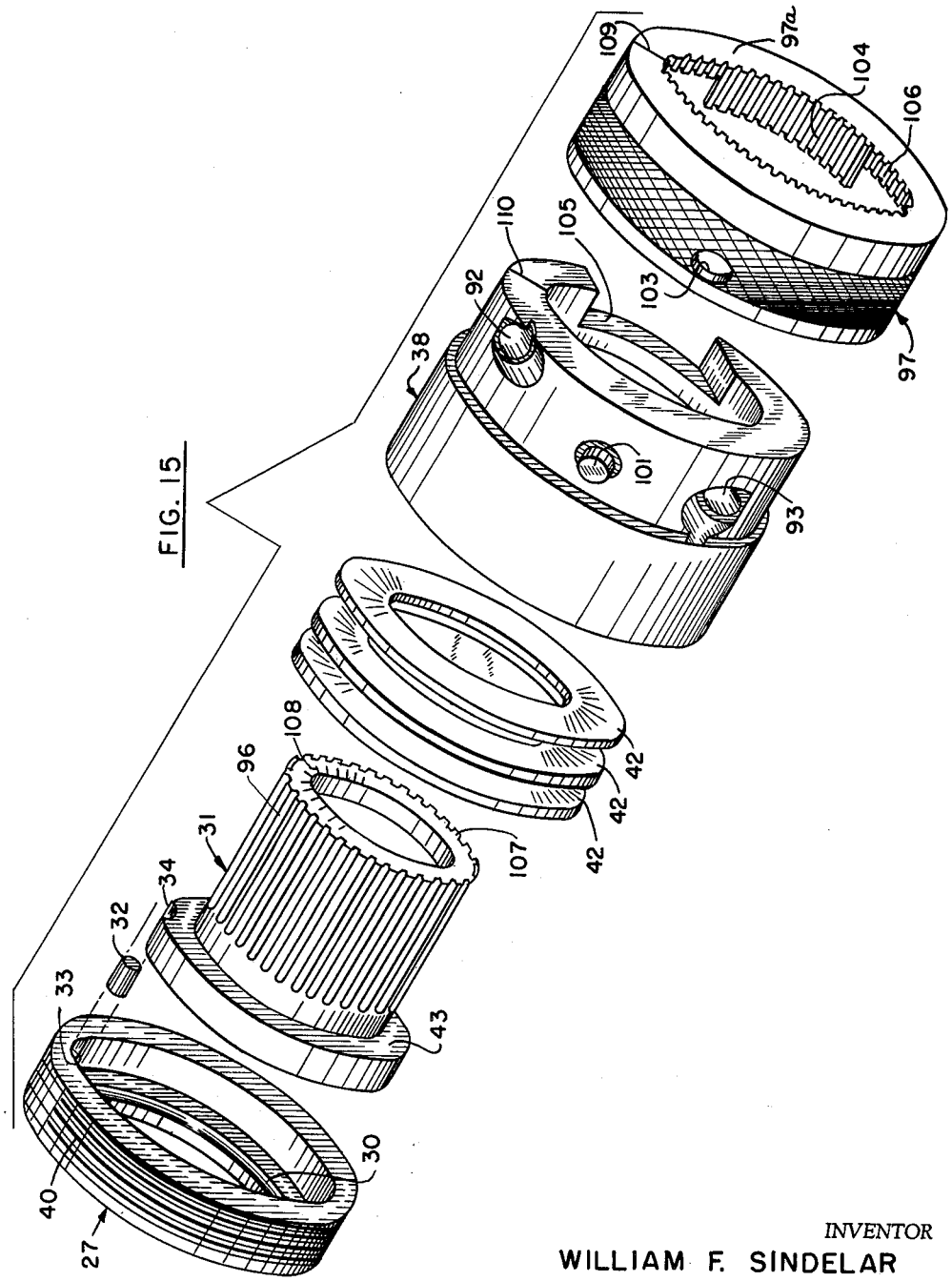

Dec. 22, 1964   W. F. SINDELAR   3,162,250
TORQUE CONTROL MEANS FOR POWER TOOLS
Filed Dec. 14, 1961   8 Sheets-Sheet 5
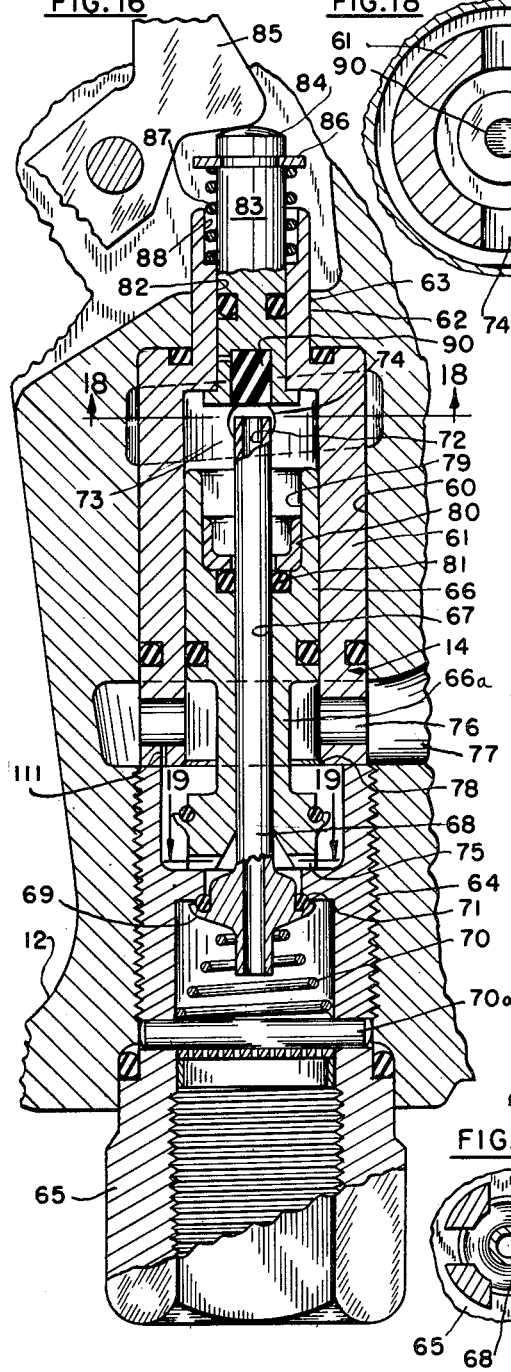
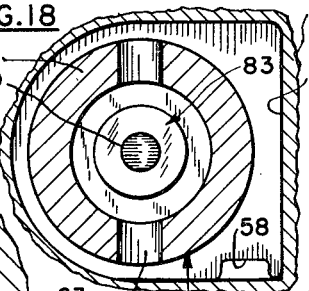
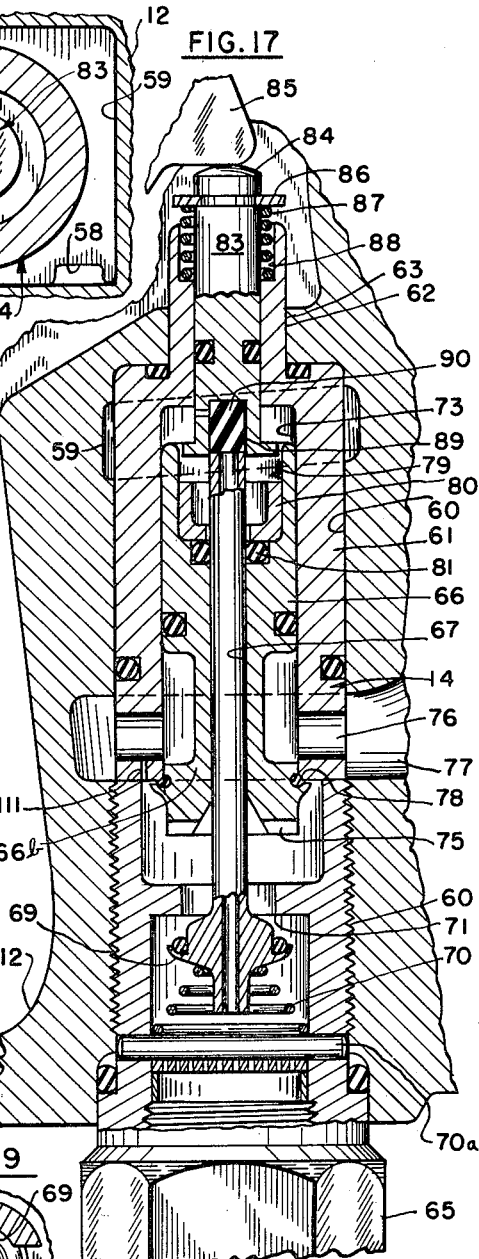
INVENTOR
WILLIAM F. SINDELAR
BY Leonard Bloom
ATTORNEY Dec. 22, 1964  W. F. SINDELAR  3,162,250
TORQUE CONTROL MEANS FOR POWER TOOLS
Filed Dec. 14, 1961  8 Sheets-Sheet 6

INVENTOR
WILLIAM F. SINDELAR

BY *Leonard Bloom*

ATTORNEY

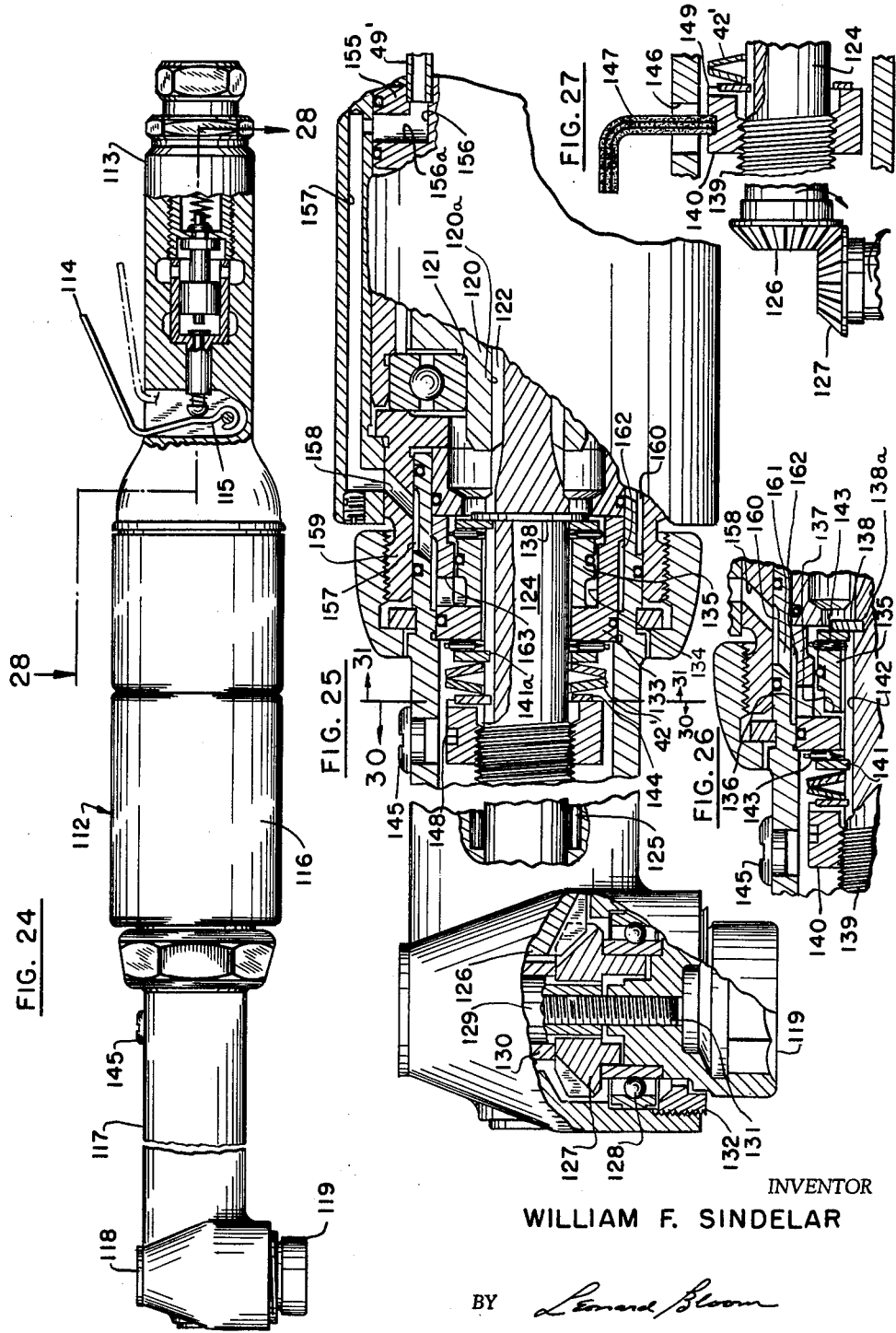

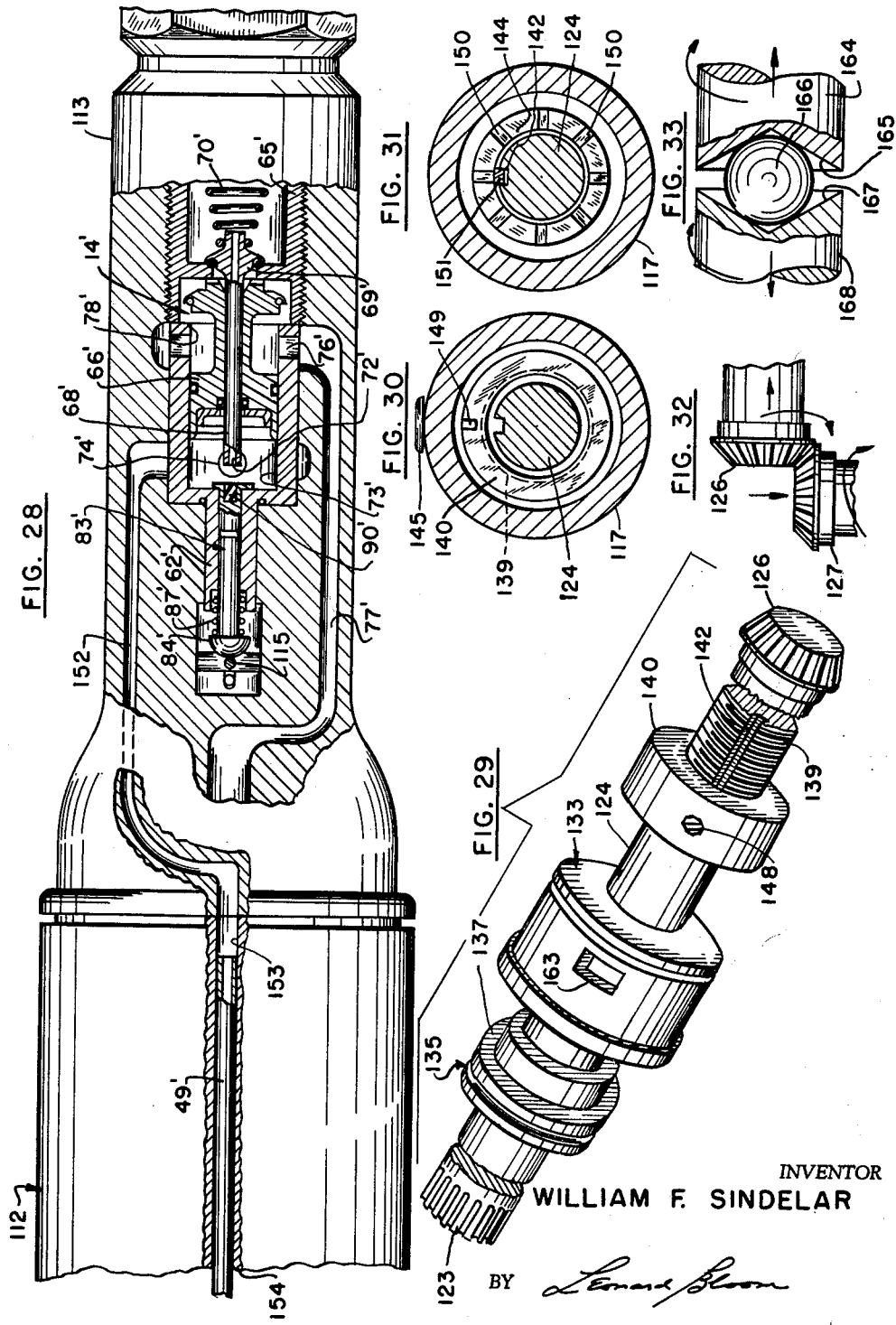

United States Patent Office 3,162,250
Patented Dec. 22, 1964

3,162,250
TORQUE CONTROL MEANS FOR POWER TOOLS
William F. Sindelar, Seven Hills, Ohio, assignor to Master
Power Corporation, Solon, Ohio, a corporation of Ohio
Filed Dec. 14, 1961, Ser. No. 159,320
24 Claims. (Cl. 173—12)

The present invention relates to torque control means for power tools, and more particularly, to torque control means for a pneumatic wrench or the like, whereby the tool will be automatically shut down at the predetermined desired torque setting of the nut or bolt.

Introduction

In the art relating generally to torque control means for power tools, either pneumatically or electrically driven, wherein the purpose or end result is to set a nut or bolt to a predetermined desired torque, a number of prior concepts have been suggested, some of which have been placed on the commercial market; but none of the prior concepts have been entirely satisfactory, and indeed, have met with only a modicum of success, inasmuch as they suffer from one or more of the following deficiencies: one, the prior concepts mainly tend to "sense" the torque output of the motor or associated clutch mechanism, not the torque setting of the bolt itself, and hence, such concepts are subject to variations in the pressure of the pneumatic line (or voltage of an electric line) as well as being dependent upon wear of the individual components of the motor or clutch mechanism; two, of those few prior concepts that do "sense" the torque of the bolt, as by means of an expensive pretorsioned member, the torque of the bolt is not used directly to deactivate the tool, but rather, the torque of the bolt is in turn translated into another (and usually unreliable) function, which, for example, may comprise the rebound of the hammer mass in an impact clutch mechanism; three, the prior concepts, to a practical degree, are not repeatable, that is, not capable of setting a plurality of bolts, each to a constant torque without otherwise continually readjusting the mechanism; four, the prior concepts are generally incapable of accommodating a wide range of bolt sizes, from small bolts up to the largest bolt that the tool is capable of handling satisfactorily; five, the prior concepts often lack ruggedness and durability, which is of course a serious defect; six, the prior concepts often lack the means for making an easy and positive adjustment; seven, the prior concepts are quite often complicated and bulky mechanisms which, being unwieldly, interfere with the operator's normal use of the tool; and eight, and as a further deficiency, the prior concepts are often not economical to assemble, nor are they readily serviceable.

Objects

Accordingly, it is the paramount object of the present invention to alleviate all of the aforementioned deficiencies of the prior concepts by providing, for use with a power-driven wrench, screwdriver or the like, torque control means that is repeatable, durable, easy to adjust, capable of accommodating a wide range of bolt sizes, compact and unobtrusive, easy and economical to assemble, and readily serviceable.

It is another object of the present invention to provide, for use with a pneumatic wrench or the like, torque control means that will automatically shut down the pneumatic motor at the predetermined desired torque setting of the bolt.

It is still another object of the present invention to provide, for use with a pneumatic wrench or the like, valvular means responsive to a drop in pressure in an auxiliary air conduit, so as to deactivate the driving means at the predetermined desired torque.

It is yet still another object of the present invention to provide valvular means including a primary valve and a secondary valve, wherein the primary valve is initially engaged to trap a quantity of pressurized air in an auxiliary conduit and thereafter is actuated to admit a constant flow of pressurized air to the main conduit leading to the motor, and wherein the secondary valve is thereafter responsive to a drop in pressure in the auxiliary conduit to shut off the flow of pressurized air to the main conduit, thereby to deactivate the motor at the predetermined torque.

It is a further object of the present invention to provide means responsive to the torque imparted by the driven means to the driving means to generate an axial separating force tending to open an auxiliary air conduit, wherein adjustable counteracting means are provided to generate an axial counteracting force tending to maintain the auxiliary air conduit closed, in combination with valvular means responsive to the opening of the auxiliary conduit to deactivate the driving means at the predetermined desired torque.

It is a still further object of the present invention to provide a coupling means, such as a helical spline formation, between a driving member and a driven member, thereby coupling the members together for rotation in unison, and thereby generating an axial force proportional to the torque and tending to separate the members.

It is a yet still further object of the present invention to provide, for use in conjunction with driving and driven means constantly in rotative engagement with each other, torque control means comprising sensing means to generate a force directly proportional to the torque between the driving and driven means, adjustable means including a resilient member generating a predetermined counterforce opposing the force generated by the sensing means, and responsive means to stop the driving means whenever the force generated by the sensing means exceeds the predetermined counterforce generated by the adjustable means.

In accordance with the teachings of the present invention, there is provided in a device operative from a source of a working medium under pressure, the combination of driven means, driving means activated by the source and imparting a torque to the driven means, and torque control means to deactivate the driving means at the predetermined desired torque. The torque control means includes a pair of cooperating members normally in sealing engagement with each other. One of the members is associated with the driving means, while the other member is associated with the driven means. Means are provided, proportional to the torque imparted by the driving means to the driven means, to generate a force tending to separate the members; and further means are provided—externally adjustable of the device—to generate a counterforce tending to maintain the members in sealing engagement with each other. An auxiliary conduit is formed in the device. The conduit leads from the members and communicates with the source of the working medium. Valvular means is provided in the device. The valvular means is responsive to a drop in pressure in the auxiliary conduit to deactivate the driving means. Consequently, when the predetermined torque is reached, the members separate, the pressure drops sufficiently; and hence, the valvular means deactivates the driving means.

More specifically, in an exemplary embodiment of the present invention, such as in a pneumatic impact wrench, an anvil is rotatively coupled to a driven member by means of a helical spline formation, which generates a force tending to separate a pair of abutting surfaces, one on the anvil and the other on the driven member. This separating force is counteracted by a series of Belleville springs, the force of which is adjustable, such that the abutting surfaces are normally in air-sealing engagement with each other. An auxiliary air conduit is formed in the driven member and leads to the abutting surfaces. The conduit is pressurized with compressed air and is isolated when the trigger rod closes off the bore of a primary valve. As the trigger rod is further depressed, the primary valve is unseated; and air under pressure is admitted to the motor via ports in a secondary valve and openings in the valve bushing. At the predetermined torque, the abutting surfaces separate. The isolated compressed air in the conduit is then released to atmosphere. A pressure differential is thus formed on the secondary valve, which closes against its valve seat and cuts off the air being supplied to the pneumatic motor. Consequently, the drive to the anvil and driven member is stopped at the predetermined torque. Thereafter, when the trigger rod is released, the valve mechanism returns to its original position; and the abutting surfaces are again in air-sealing engagement with each other.

These and other objects of the present invention will become apparent from a reading of the following specification, taken in conjunction with the enclosed drawings, an outline of which is as follows:

Outline of the Drawings

FIGURE 1 is a side elevational view of a preferred embodiment of the present invention, with parts broken away and sectioned to illustrate an overall concept;

FIGURE 2 is a partial end elevational view taken along the lines 2—2 of FIGURE 1;

FIGURE 3 is an enlarged view of the front portion of the embodiment shown in FIGURE 1;

FIGURE 4 is a view of a portion of FIGURE 3, but showing the abutting surfaces separated at the predetermined torque release point;

FIGURE 5 is a view of a portion of FIGURE 3, but showing the mechanism adjusted for a higher value of torque release;

FIGURE 6 is an enlarged sectional view taken along the lines 6—6 of FIGURE 1, showing part of the adjusting means, and further showing the adjusting key in broken lines;

FIGURE 7 is an enlarged sectional view taken along the lines 7—7 of FIGURE 1, showing the abutting surface of the driving member in elevation, and further showing the communicating passageways formed in the driven member;

FIGURE 8 is an enlarged sectional view taken along the lines 8—8 of FIGURE 1, showing an additional part of the adjusting means, and further showing a portion of the auxiliary air conduit formed in the driven member;

FIGURE 9 is a sectional view taken along the lines 9—9 of FIGURE 1, showing a portion of the auxiliary air conduit formed in the tool;

FIGURE 10 is a sectional view taken along the lines 10—10 of FIGURE 1, showing a further portion of the auxiliary air conduit formed in the tool;

FIGURE 11 is a sectional view taken along the lines 11—11 of FIGURE 10, showing a portion of the auxiliary air conduit formed as an internal core in the casting of the pendant handle portion of the motor housing;

FIGURE 12 is a sectional view taken along the lines 12—12 of FIGURE 1, showing the valve bushing and further showing the main air conduit to the motor;

FIGURE 13 is an exploded view of the driving and driven members, with parts broken away to show the interengaging helical spline formation, and with further parts broken away to show the auxiliary air conduit and communicating passageways;

FIGURE 14 is an exploded view of a portion of the adjusting means, showing the detent means between the locking collar and the body member, with parts broken away to show the keying of the body member to the locking collar, and further showing the adjusting key in relation to the adjusting means;

FIGURE 15 is an exploded view of the adjusting means, showing the Belleville springs for generating a counterforce tending to maintain the abutting surfaces in air-sealing engagement with each other:

FIGURE 16 is an enlarged longitudinal sectional view of the valvular means associated with the present invention;

FIGURE 17 is a view corresponding to that of FIGURE 14, but showing the secondary valve actuated to cut off the air being supplied to the motor;

FIGURE 18 is a view taken along the lines 18—18 of FIGURE 16;

FIGURE 19 is a view taken along the lines 19—19 of FIGURE 16;

FIGURE 24 is another embodiment of the present invention, showing its application to a different type of power tool, the latter being shown in side elevation, with part of the handle housing being broken away and sectioned to show the valvular means;

FIGURE 25 is an enlarged view of the front portion of the tool shown in FIGURE 24, with parts broken away and sectioned to show the drive means and the torque control means;

FIGURE 26 is a sectional view corresponding to a portion of FIGURE 25, but showing the abutting surfaces separated at the predetermined torque release point;

FIGURE 27 shows the means for adjusting the mechanism;

FIGURE 28 is an enlarged top plan view of the rear portion of the tool shown in FIGURE 22, with parts broken away and sectioned to show the valvular means;

FIGURE 29 is an exploded view of a portion of the torque control means, looking rearwardly of the tool;

FIGURE 30 is a view taken along the lines 30—30 of FIGURE 25, showing the detent tab on the adjusting nut;

FIGURE 31 is a view taken along the lines 31—31 of FIGURE 25, showing the face of the lock washer formed as a dimple plate;

FIGURE 32 is a schematic view of the bevel gears used in the tool of FIGURE 24, showing the axial separating force generated therebetween; and FIGURE 33 is a schematic view of yet another means of obtaining an axial separating force commensurate with a torque transmission between a driving member and a driven member.

General Environment of the Present Invention

Figure 20:
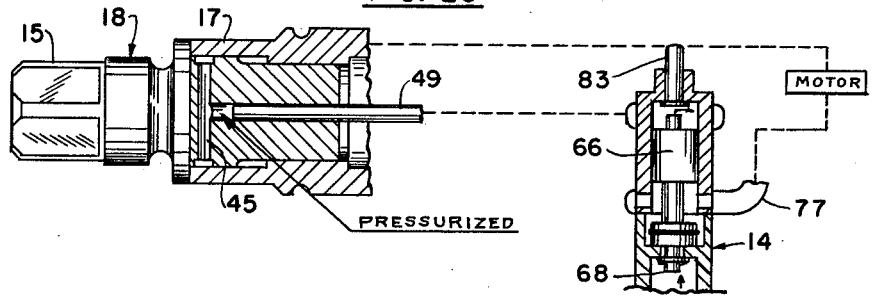
FIGURES 20 through 23 are sequence drawings, partly schematic, showing the succesive stages in the operation of the present invention.

With reference to FIGURE 1, there is illustrated a pneumatic power tool 10 of the impact wrench variety and comprising a motor housing 11 including a pendant handle housing 12, a clutch housing 13, a valvular means 14 in the handle housing 12, an output spindle 15, and torque control means—denoted generally as at 16—between the clutch housing 13 and the output spindle 15. It will be appreciated, of course, that the teachings of the present invention are equally applicable to a wide variety of power-driven tools, generally, and that the specific illustration of the pneumatic impact wrench 10 constitutes only one embodiment chosen to illustrate the essence of the present invention. With this in mind, the motor housing 11 includes a conventional pneumatic motor (not shown for convenience of illustration); and the clutch housing 13 houses an impact clutch mechanism, which includes an anvil 17 having anvil teeth 17a. The anvil 17 is journaled in a ball bearing 23, and a suitable grease seal 24 is interposed between the bearing 23 and the end of the clutch housing 13. The impact clutch mechanism forms no part of the present invention, and hence its details are omitted herein for clarity of understanding; however, the construction and operation of the impact clutch may be found in the co-pending Sindelar applications, assigned to the same assignee as that of the present invention, and issued on September 26, 1961, as U.S. Patents 3,001,428 and 3,001,429 for "Rotary Impact Wrench" and "Impact Wrench," respectively.

*Description of the Driving and Driven Means and of the Sensing Means*

With reference to FIGURES 1, 3, 4, 5, and 13, the anvil 17 comprises a driving member, which is mechanically coupled to a driven member 18 by means of a helical spline formation. The anvil or driving member 17, together with the impact clutch mechanism and the pneumatic motor, comprises the "driving means," while the driven member 18 (together with a conventional socket) comprises the "driven means."

The anvil 17 has a bore 19 which is provided with internal helical splines 20 to engage corresponding external helical splines 21 formed on the cylindrical portion 22 of the driven member 18. The driven member 18 includes the conventional output spindle 15 formed integrally thereon for engagement with a suitable socket, the latter not being shown for convenience of illustration. The anvil 17 has a flat forward face surrounding the bore 19 and comprising an abutting surface 25. The driven member 18 has a collar 22a which has a corresponding abutting surface 26, the purpose of which will hereinafter be explained in detail. The cylindrical portion 22 of the driven member 18 is received coaxially within the bore 19 of the driving member or anvil 17, such that the corresponding helical splines 20, 21 engage each other, and such that the abutting surfaces 25, 26 normally contact each other and are normally in air-sealing engagement with each other. Moreover, the abutting surfaces 25, 26 are in communication with an auxiliary air conduit, a descripiton of which is hereinafter provided. Also, it will be appreciated that the helical splines 20, 21 must be "left hand" for right-hand bolts, and that the torque control means of the present invention is operative in the tightening direction only.

The purpose of the helical splines 20, 21 is twofold: one, to impart the required torque or rotational force from the anvil 17 to the driven member 18; and secondly, because of the helical nature of the splines 20, 21, to create a corresponding axial force tending to separate anvil 17 from the driven member 18, that is, tending to separate the corresponding axial abutting surfaces 25 and 26. This axial separating force is directly proportional to the torque imparted by the driving member 17 to the driven member 18, which is to say, the torque being supplied to the nut or bolt. Consequently, means are automatically provided for "sensing" the torque being supplied to the nut or bolt, and this "sensing means" generates the aixal separating force between the driven member 18 and the driving member (or anvil) 17. The axial separating force, which is proportional to the torque, is counteracted by a force tending to maintain the surfaces 25 and 26 in abutment or sealing engagement with each other; and this counteracting force is supplied by means of a resilient member in a manner now to be explained in detail.

*Description of the Means Generating a Counterforce*

With reference to FIGURES 1, 3, 4, 5, and 15, an annular member 27 is rotatably mounted on the anvil 17 by means of a plurality of balls 28 and corresponding ball raceways 29 and 30 formed on the anvil 17 and member 27, respectively. The annular member 27 is keyed to a hollow cylindrical member 31 for rotation in unison by means of a pin 32 and corresponding semi-cylindrical grooves 33 and 34 formed, respectively, between members 27 and 31 as shown in FIGURE 15. Member 31 is rotatably mounted on the forward portion of driven member 18 by means of a plurality of balls 35 seated in corresponding ball raceways 36 and 37 formed, respectively, between member 31 and the driven member 18. A hollow body member 38 is disposed concentrically about the hollow cylindrical member 31. The body member 38 has internal threads 39 adapted to engage corresponding external threads 40 formed on the annular member 27, thereby allowing the body member 38 to be axially advanced or retracted with respect to the annular member 27. Moreover, the body member 38 has a counterbored portion 41, and a plurality of Belleville springs or washers 42, in series with each other, are disposed in the counterbored portion 41 of body member 38. The Belleville springs 42 surround the hollow cylindrical member 31 and exert a force between the body member 38 and a rearward shoulder 43 formed on the cylindrical member 31.

In understanding how the counteracting force is developed, anvil 17, annular member 27, and body member 38 may all be considered as comprising one stationary piece, whereas the cylindrical member 31 and driven member 18, on the other hand, may be considered as comprising one movable piece. The result is such that the Belleville springs 42 exert an axial force tending to move the cylindrical member 31 rearwardly, and along with member 31, the driven member 18 rearwardly into engagement with the anvil 17. Hence, the Belleville springs 42 exert an axial force tending to maintain the abutting surfaces 25 and 26 in air-sealing engagement with each other, thus counteracting the axial separating force of the helical splines 20 and 21.

In partial summary, then, the means for generating a counterforce tending to oppose the sensing means and maintaining the abutting surfaces 25, 26 in air-sealing engagement with each other includes the resilient means, which in this case comprises the Belleville springs 42.

*Description of the Auxiliary Air Conduit*

With reference to FIGURES 1, 3, 4, 7, 8, 9, 10, 11, and 13, the driven member 18 has a blind axial bore 44, and a plurality of radial passageways 45 communicate the bore 44 with the abutting surfaces 25 and 26. The passageways 45 all lie in a common plane which passes perpendicularly of the bore 44, with the bore 44 terminating at the common plane. The driven member 18 further has a counterbore 46 within which a sleeve 47 is loosely received, and a pair of resilient sealing rings 48 are received within the counterbore 46 adjacent to sleeve 47. A tube 49 is loosely received within the bore 44 and is supported by the sleeve 47. The tube 49 passes longitudinally through the clutch mechanism and pneumatic motor (not shown for ease of illustration) and terminates rearwardly in a flared rearward end portion 50, which is received coaxially within a tube assembly member 51. Member 51 has a countersink 51a, and the flared end 50 of tube 49 is adhesively secured therein in air-sealing engagement with member 51, with the flared end 50 being flush with the rearward face of member 51. Tube assembly member 51 is received within a first annular recess 52 formed in end cap 53, which is in turn secured rearwardly of the motor housing 11. End cap 53 has a second annular recess 52a, which has a smaller diameter than the first annular recess 52, thus allowing the tube assembly member 51 to shoulder against the second annular recess 52a. Member 51 carries a sealing ring 54, so that the member 51 is in air-sealing engagement with the end cap 53. The end cap 53 has a pair of canals 55 and 56, which are formed at right angles to each other for reasons of manufacturing convenience. The canals 55, 56 communicate the annular recess 52a of end cap 53 with a longitudinal passageway 57 formed in the motor housing 11. Passageway 57 in turn communicates with an internal core 58 formed in the original casting of the pendant handle housing 12 of the motor housing 11. Core 58 in turn communicates with an internal recess 59 formed in the pendant handle housing 12, and recess 59 communicates with the valvular means 14, the latter being hereinafter described in detail.

The combination of passageways 45, blind axial bore 44 in the driven member 18, tube 49, annular recess 52a in end cap 53, canals 55 and 56, passageway 57, internal core 58 in the pendant handle housing 12, and internal recess 59 leading to the valvular means 14—thus comprise one embodiment of the auxiliary air conduit, which is normally sealed by means of the abutting surfaces 25, 26; and the means for pressurizing this auxiliary air conduit and isolating it during the operation of the tool 10, as well as a preferred embodiment of the valvular means of the present invention, will now be described in detail.

*Description of the Valvular Means*

With reference to FIGURES 1, 12, 16, 17, 18, and 19, the pendant handle housing 12 has a bore 60, and a cylindrical valve bushing 61 is slip-fitted within an inner portion of the bore 60. The bushing 61 has a reduced portion 62 which is also slip-fitted within a constricted portion 63 of the housing 12, such that the bushing 61 shoulders against the constricted portion 63. The remaining portion of the bore 60 is threaded as at 64 for receiving the threaded inlet bushing 65, and a suitable source (not shown) of compressed air in the order of 90 p.s.i. is coupled to the tool by means of the inlet bushing 65. A secondary valve 66 is slidably received within the valve bushing 61. The secondary valve 66 has a bore 67 to receive a sliding primary valve 68 therein, the primary valve extending fore and aft beyond the secondary valve 66. The primary valve 68 has an enlarged portion 69, which, being under a pressure differential as well as under the influence of a spring 70, normally seats against a valve seat 71 formed within the inlet bushing 65. Valve seat 71 comprises an inner annular lip formed within the inlet bushing 65, and the spring 70 rests upon a transverse pin 70a carried by the inlet bushing 65. Also, the primary valve 68 has a bore 72 by means of which the source of high pressure air communicates with the chamber 73. The chamber 73 leads to a pair of ports 74 formed in the valve bushing 61 as shown in FIGURE 18. The ports 74 communicate with the internal recess 59 of the auxiliary air conduit. Consequently, the auxiliary air conduit is normally pressurized by the source of compressed air. Moreover, inasmuch as chamber 73 is pressurized in the "at rest" position of the valvular means, the secondary valve 66 is normally in the position illustrated in FIGURE 16, that is, the secondary valve 66 is down against the opposite side of the valve seat 71 of the primary valve 68. The secondary valve 66 has a slotted end portion defining a plurality of ports 75, as shown more clearly in FIGURE 19. The valve bushing 61 in turn has a plurality of ports 76, which communicate with the main air conduit 77 leading to the pneumatic motor. The ports 76 are radially of the reduced intermediate portion 66a of the secondary valve 66. The end of the valve bushing 61 defines a valve seat 78 for the outer portion 66b of the secondary valve 66. Secondary valve 66 is normally off of its valve seat, as shown in FIGURE 16, and the purpose of valve seat 78 will hereinafter become apparent. The secondary valve 66 also has a counterbore 79, and a cap sleeve 80 is press-fitted within the counterbore 79 so as to trap a resilient sealing ring 81 between the primary valve 68 and the secondary valve 66. Several other sealing rings are utilized as shown on the drawings, but being conventional, are not specifically enumerated herein. The innermost reduced portion 62 of the valve bushing 61 has a bore 82 within which a trigger rod 83 is slidably disposed. The innermost end 84 of the trigger rod 83 is urged against a pivoted bell crank 85 by means of washer 86 and spring 87, the latter being received within counterbore 88 of the innermost reduced portion 62 of valve bushing 61. The opposite end of trigger rod 83 protrudes partially within the chamber 73 and has a blind axial bore 89 within which rubber plug 90 is secured, the purpose of which will hereinafter become apparent. Moreover, the pivoted bell crank 85 is adapted to be engaged by the finger-actuated slidable trigger 91, which is carried by the pendant housing 12 as shown in FIGURE 1.

*Description of the Adjusting Means*

With reference, again, to FIGURES 1, 2, 3, 5, 6, 14, and 15, the body member 38 is provided with a pair of transverse openings 92 and 93 disposed diametrically opposite from one another (when viewed in FIGURE 6); and an adjusting key 94 having a right-hand worm thread 95 is provided for selective insertion in either of the openings 92 or 93 in order to adjust the torque setting of the mechanism. The worm thread 95 on adjusting key 94 mates with longitudinal splines 96 formed externally on the cylindrical member 31 forwardly of its rearward shoulder 43. Moreover, as shown more particularly in FIGURES 1 and 14, each of the openings 92 and 93 are angled slightly by an amount equal to the helix angle of the worm thread 95, such that the adjusting key 94 may be inserted in either of the openings 92, 93 for proper engagement of the worm thread 95 with the splines 96. The openings 92 and 93 are angled oppositely from one another. The worm thread 95 is designed for "right-hand" turning of the adjusting key 94; thus, the opening 93 is used to "tighten" the torque setting of the mechanism, while opening 92 is for "loosening" of the torque setting, which is to say, the spring effect exerted by the Belleville springs 42.

As the adjusting key 94 is turned, the worm threads 95 engage the splines 96 of member 31, thus rotating member 31; and hence, because of the pin 32, the annular member 27 will rotate. Then, because of the threads 39, 40, as the annular member 27 is rotated, body member 38 will move axially (in either direction) with respect to annular member 27, which may be considered as stationary. Consequently, the Belleville springs 42 will be axially compressed, as shown in FIGURE 5, (or released, as the case may be); and it will be recalled that the Belleville springs 42 exert the axial counterforce tending to maintain the abutting surfaces 25 and 26 in air-sealing engagement with each other against the axial separating force associated with the helical spline formation 20, 21.

*Description of the Locking and Detent Means for the Adjusting Means*

In order to insert the adjusting key 94 in the desired opening 92 or 93 and to adjust the tension of the Belleville springs 42 in the manner aforesaid, a locking collar 97, which is slidably mounted on the body member 38, must be removed. For this purpose, detent means are provided between the body member 38 and the locking collar 97, as shown more particularly in FIGURES 6 and 14. The detent means includes a transverse blind bore 98 in the body member 38. The bore 98 is circumferentially intermediate of the transverse openings 92 and 93, and an insert cap sleeve 99 is press-fitted in bore 98. A detent member 100 is slidably guided within sleeve 98, and the detent member 99 has a protruding tip 101. A spring 102 is disposed in bore 98 and between bore 98 and detent member 100, and an opening 103 in the locking collar 97 allows the tip 101 of detent member 100 to project therethrough. Consequently, to remove the locking collar 97 from the body member 38, the detent member 100 must first be depressed to clear the protruding tip 101 from the locking collar 97; and thereafter, locking collar 97 may be slidably removed from body member 38.

Moreover, the locking collar 97 is provided with an internal arcuate key 104 (see FIGURES 14 and 15) which is adapted to be slidably received in a corresponding keyway 105 formed in body member 38 (see FIGURES 6 and 14), the keyway 105 being circumferentially opposite the detent means. Thus the locking collar 97 is oriented circumferentially for easily sliding the locking collar 97 over the body member 38, whereby the detent means will thereafter hold the locking collar 97 onto the body member 38. Also, the locking collar 97 includes a forward flange portion 97a which is provided with internal splines 106 that mate with a portion of the external splines 96 on member 31, as shown more particularly in FIGURES 3 and 14.

With reference to FIGURES 2, 14, and 15, the cylindrical member 31 has a forward face 107 provided with graduations 108, which cooperate with an indicator line 109 on the flange 97a of locking collar 97, thus providing a relative measure of the predetermined torque-release setting of the adjusting mechanism. Also, the body member 38 is provided with a normally-obscured indicator line 110, which, by virtue of the key 104 and keyway 105, will always be in circumferential alignment with the indicator line 109 on the locking collar 97. Accordingly, whenever the locking collar 97 is removed in order to adjust the mechanism, the previous relative measure of the torque setting is still apparent to the operator. Consequently, a relative indication of the predetermined torque release point is always available.

*Operation of the Torque Control Means*

With general reference again to FIGURES 1 through 19, and with particular reference to FIGURES 20 through 23, the inherent utility of the present invention will now be explained.

Assuming that the tool 10 is coupled via inlet bushing 65 to a suitable source of compressed air, and that the trigger 91 is not as yet actuated, then the position of the valvular means 14 is that as shown in FIGURES 1, 16, and 20. The primary valve 68 is seated upon its valve seat 71. The chamber 73 (leading to the auxiliary air conduit) is pressurized by means of the bore 72 in the primary valve 68, thus causing the secondary valve 66 to remain off of its valve seat 78.

Figure 21:
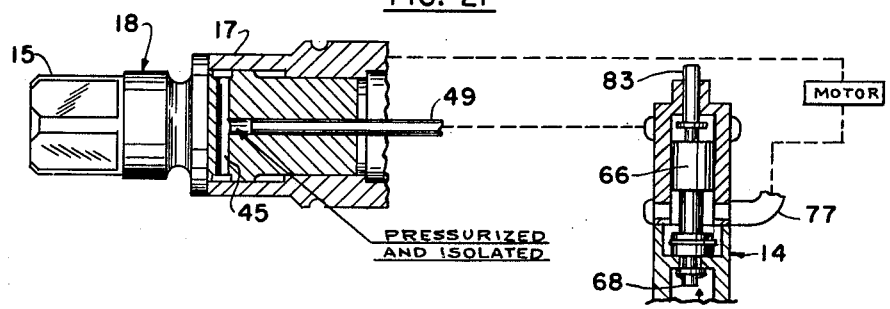

When the trigger 91 is initially depressed, as shown in FIGURE 21, the pivoted bell crank 85 pushes the trigger rod 83 down within the bore 82 against the tension of spring 87. Hence, the rubber plug 90 (carried in the bore 89 of the trigger rod 83) seats against the end of the primary valve 68, thus closing the bore 72 of primary valve 68. Consequently, the chamber 73 and the auxiliary air conduit—including the bore 44 and the radial passageways 45 leading to the abutting surfaces 25, 26—become isolated from the source of compressed air, yet remains pressurized until the abutting surfaces 25, 26 are separated.

Figure 22:
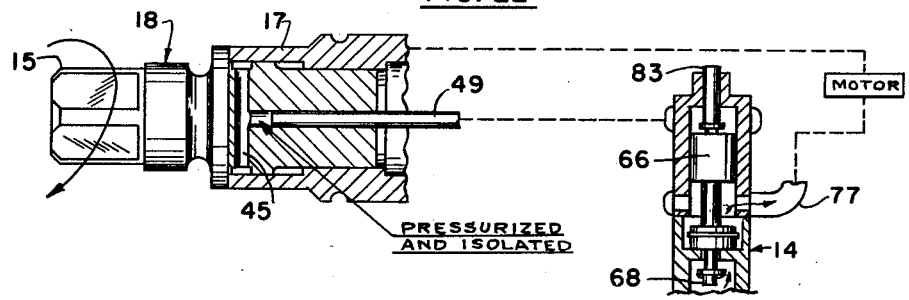

Next, as shown in FIGURE 22, as the trigger 91 is further depressed, the pivoted bell crank 85 further causes the trigger rod 83 to slide the primary valve 68 down within the bore 67 of the secondary valve 66, thus unseating the primary valve 68 from its valve seat 71. High-pressure "live" air is then admitted around the now-unseated primary valve 68, thence through ports 75 in the secondary valve 66 and ports 76 in the valve bushing 61 to the main air conduit 77 for the pneumatic motor. Consequently, the motor is actuated to in turn actuate the impact clutch mechanism in a manner understood by one skilled in the art; and the rotative force or torque is imparted from the output spindle 15 of the driven member 18 to the conventional socket for ultimately seating a nut or bolt. The abutting surfaces 25, 26 are still in engagement with each other; and the auxiliary air conduit remains isolated, yet pressurized, as the nut or bolt is seated to its predetermined desired torque.

Figure 23:
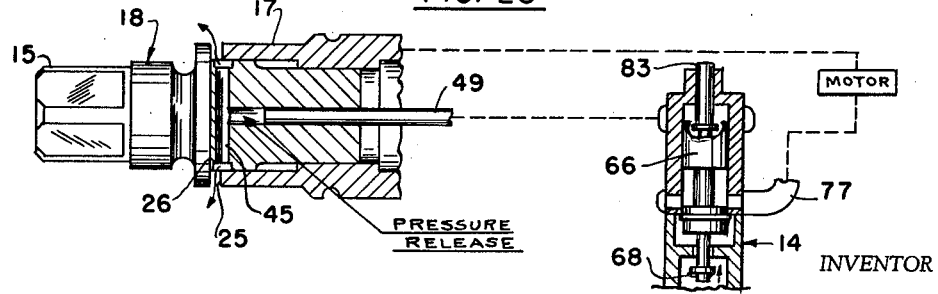

When the predetermined torque is reached, the axial separating force (generated by virtue of the helical spline formation 20, 21 on the respective driving and driven members 17, 18) overcomes the pre-set counteracting force of the Belleville springs 42. Consequently, as shown schematically in FIGURE 23, and in detail in FIGURE 4, the abutting surfaces 25, 26 separate slightly—in the order of a few thousandths of an inch in a preferred embodiment of the present invention—thus communicating the auxiliary air conduit to atmosphere and allowing the pressurized air (previously entrapped therein) to bleed off or escape. The chamber 73 is no longer pressurized, and there is no longer an equality of pressures on opposite ends of the secondary valve 66. Since the outer portion 66b of the secondary valve 66 is under the influence of the high-pressure source, a pressure differential is formed on opposite ends of the secondary valve 66. Therefore, as shown in FIGURE 23, and in detail in FIGURE 17, the secondary valve 66 immediately seats against its valve seat 78, thus sealing off the high-pressure source from the main air conduit 77, and thus stopping the motor and precluding the further driving of the nut or bolt. Naturally, it will be appreciated that the action of the secondary valve 66 in stopping the motor, upon the initial separation of the abutting surfaces 25, 26 is substantially instantaneous, and that the operation herein related in sequential form is for clarity of understanding.

The tool 10 will thus be shut down as long as the trigger 91 is held in the depressed position, although the driving member 17 and driven member 18 (by reason of the splines 20, 21) are constantly in rotative engagement with each other. Then, when the trigger 91 is released, the trigger rod 83 is retracted by means of the spring 87 aided by the air pressure through bore 72 of primary valve 68. The engagement between the trigger rod 83 and the primary valve 68 is broken; and thereafter, the primary valve 68 (being under the influence of spring 70) returns to its valve seat 71, which is the initial position of the primary valve 68 as shown in FIGURES 16 and 20. A bleed-off port 111 allows the "live" air entrapped between the primary valve 68 and secondary valve 66 to escape via the main air conduit 77 to the motor.

Moreover, inasmuch as the motor is stopped, the abutting surfaces 25, 26 are again in engagement with each other, being now solely under the influence of the Belleville springs 42. Furthermore, when the primary valve 68 is seated upon its valve seat 71, and the trigger rod 83 (and rubber plug 90 thereof) are no longer in engagement with the end of the primary valve 68, high pressure air is again admitted (via bore 72 of primary valve 68) to chamber 73; and thus, the chamber 73 and the auxiliary air conduit are again filled with a pressurized quantity of entrapped air. Thereafter, the tool 10 may be used to seat another nut or bolt to the same torque as the prior one, without any necessity for readjusting the mechanism; and the trigger 91 may again be depressed to commence the series or sequence of steps as hereinbefore recited. Also, it will be understood that the air in the auxiliary air conduit need not be entirely isolated, and that the torque control means will still be operative, although at reduced sensitivity, should a slight bleed of air occur.

In summary, the valvular means is responsive to a drop in pressure in the auxiliary air conduit to shut off the motor at the predetermined torque release point; and hence, the subcombination of the valvular means and the auxiliary air conduit comprises the "responsive means," which stops the driving means whenever the force generated by the sensing means exceeds the predetermined counterforce established by the adjustable means.

*Description of Another Embodiment*

As hereinbefore stated, the essence of the present invention is not necessarily confined to a tool of the impact wrench variety, but rather, is equally applicable to a wide variety of power tools capable of delivering a torque or rotative force. Accordingly, and with reference first to FIGURE 24, there is illustrated a pneumatic nut-runner 112, sometimes referred to in the art as a "stall tool," and comprising an "in-line" handle portion 113, a paddle trigger 114 having a pivoted lever member 115 for actuating the valvular means in the handle 113, an "in-line" cylindrical motor housing 116 having a conventional pneumatic motor, a shaft housing 117 including an angle head portion 118, and a conventional socket 119.

With reference to FIGURE 25, a rotating carrier or driver 120 is journaled in the motor housing 116 by means of a ball bearing 121 and is adapted to be coupled in a suitable manner to the usual pneumatic motor, the latter not being shown for convenience of illustration. The driver 120 has a bore 120a which is provided with internal longitudinal splines 122 adapted to engage corresponding external longitudinal splines 123 formed on the shaft 124, the shaft 124 being received within the bore 120a. Shaft 124 is in turn journaled in the shaft housing 117 by means of a roller bearing 125. Thus, the shaft 124 is rotatably coupled to the driver 120 (and hence to the motor) for rotation in unison, and moreover, the shaft 124 may have a limited axial movement rearwardly with respect to the housing 117 by reason of the splines 122, 123.

Shaft 124 carries a bevel pinion 126 to engage a bevel gear 127, the latter being journaled in angle-head 118 by means of a ball bearing 128. Bevel gear 127 has a keyed connection 129 with the socket 119, which is retained axially by means of the threaded stud 131. Moreover, bearing 128 is retained in angle-head 118 by means of a threaded collar 132.

In such a manner, the rotation of shaft 124 is transmitted to the socket 119; and simultaneously, as shown schematically in FIGURE 32, an axial separating force is generated between bevel pinion 126 and bevel gear 127, the force being directly proportional to the torque transmitted therebetween.

With reference to FIGURES 25, 26, and 29, an annular member comprising a first abutting member 133 is loosely or non-rotatably mounted on the shaft 124 in air-sealing engagement with the housing 117; and member 133 is counterbored as at 134 to receive another annular member comprising a second abutting member 135, which is also loosely or non-rotatably mounted on the shaft 124 rearwardly of member 133. Member 133 has an abutting surface or seal face 136, while member 135 has a corresponding abutting surface or seal face 137. Seal faces 136 and 137 of members 133 and 135, respectively, are normally in air-sealing engagement with each other. Member 133 may be considered as stationary with respect to the shaft housing 117, while member 135 has a limited axial movement rearwardly with respect to the housing 117, as will hereinafter become apparent.

Shaft 124 carries a snap ring 138 received in an external annular groove 138a, and shaft 124 is threaded as at 139 to receive an adjusting nut 140. A pair of Belleville springs 42′, in series with each other, are received between the adjusting nut 140 and the snap ring 138, thus exerting a counterforce tending to maintain the members 133 and 135 in air-sealing engagement with each other. A pair of key washers or thrust plates 141 are positioned fore and aft of members 133 and 135, the thrust plates 141 having respective keys 141a received in a longitudinal slot 142 formed in shaft 124; and a pair of needle thrust bearings 143 are interposed between the thrust plates 141 and the members 133, 135. Also, a lock washer 144 is placed between the adjusting nut 140 and the Belleville springs 42′.

With reference to FIGURES 25 and 27, the tension of the Belleville springs 42′—which is to say, the counterforce tending to maintain the seal faces 136, 137 in engagement with each other—may be adjusted in the following manner. A cap plug 145 is removed from the opening 146 formed in the housing 117 radially of the adjusting nut 140, and a suitable tool (such as the Allen wrench 147) is inserted through opening 146 to be received in a hexagonal socket 148 formed on the adjusting nut 140. Shaft 124 may thus be held against rotation, and the socket 119 may then be manually rotated so as to rotate shaft 124 through bevel gear 127 and bevel pinion 126. Hence, the adjusting nut 140 may be axially advanced (or retracted) along the threaded portion 139 of shaft 124 so as to adjust the tension of the Belleville springs 42′.

With reference to FIGURES 25, 30, and 31, the adjusting nut 140 carries a rearwardly-protruding tab 149, which is adapted to be received within any one of a series of circumferentially-spaced grooves or indentations 150 formed in the lock washer 144, thus providing a detent type of movement between the adjusting nut 140 and the lock washer 144. The lock washer 144 is in turn keyed to the shaft 124 for rotation in unison by means of a key 151 received in the longitudinal slot 142 of the shaft 124.

With reference to FIGURE 28, it will be appreciated that the valvular means utilized in the handle 113 of the pneumatic nut-runner 112 is identical to the valvular means hereinbefore explained with reference to the pneumatic impact wrench 10; consequently, primed numerals have been utilized to designate identical parts throughout, such as the primary valve 68′, the secondary valve 66′, and the main air conduit 77′. In lieu of the sliding trigger 91, however, the nut-runner 112 utilizes the paddle trigger 114 as hereinbefore noted. The paddle trigger 114 includes the pivoted lever 115 that actuates the trigger rod 83′; thus the pivoted lever 115 performs the same function as the pivoted bell crank 85 of the impact wrench 10.

The formation of the auxiliary air conduit in the nut-runner 112, however, is different from that which has previously been explained for the impact wrench 10. With reference to FIGURES 28 and 25, the chamber 73′ of the valvular means communicates via ports 74′ with a passageway 152 formed within the handle housing 113. Passageway 152 communicates with a tube 49′ that is received within a longitudinal groove 153 formed within the wall 154 of the hollow cylindrical motor housing 116. Groove 153 extends along the motor housing 116 (radially of the motor), and tube 49′ is secured within a tube assembly member 155 as shown in FIGURE 25. Tube assembly member 155 has a pair of canals 156 and 156a which communicate with a longitudinal passageway 157 formed forwardly of tube 49′ and within the wall 154 of motor housing 116. Passageway 157 in turn leads to a port 158 formed within the inner concentric housing member 159, thence via an external annular groove 160, port 161, and internal annular groove 162—the latter three all being formed within shaft housing 117—to a port 163 formed in the first abutting member 133 and leading to the seal faces 136, 137. The auxiliary air conduit for the pneumatic nut-runner 112, like the auxiliary air conduit for the impact wrench 10, runs between the chamber 73′ to the seal faces 136, 137; but rather than running centrally of the tool, that is to say, axially of the pneumatic motor and clutch mechanism, the auxiliary air conduit may, as shown with reference to the nut-runner 112, extend along the motor housing radially of the pneumatic motor. Such a formation of the auxiliary air conduit may be used whenever the dimensions of the particular rotary power tool involved are such that the auxiliary air conduit cannot otherwise be formed conveniently along the axis of the motor.

The operation of this embodiment of the present invention is analogous to that as related to the impact wrench 10 and is as follows. The auxiliary air conduit is normally pressurized, and the seal faces 136 and 137 are normally in air-sealing engagement with each other, being under the influence of the Belleville springs 42′. When the paddle trigger 114 is initially depressed, the rubber plug 90′ seals off the bore 72′ of primary valve 68′, thus isolating the pressurized auxiliary air conduit. Further depression of the paddle trigger 114 unseats the primary valve 68′, and "live" air enters the main air conduit 77′ to the motor, thus actuating the tool. At the predetermined torque release point, the axial separating force—generated by reason of the bevel pinion 126 and bevel gear 127—overcomes the counterforce generated by the Belleville springs 42′. The shaft 124 moves rearwardly by a slight amount; and as shown in FIGURE 26, the seal faces 136, 137 separate, being under the influence of the pressure in the auxiliary air conduit. The isolated compressed air in the auxiliary air conduit is allowed to escape, and the secondary valve 66' immediately closes upon its valve seat 78', thus shutting off the supply of "live" air to the motor.

As a coupling means between a rotating driving shaft and a rotatable driven spindle, the use of bevel gears 126, 127 corresponds, then, to the complementary helical splines 20, 21 of the impact wrench 10; but within the scope of the present invention, other means are contemplated for generating an axial separating force along with a torque transmission between a driving and a driven member. For example, as shown in FIGURE 33, a driving member 164 may have a cam surface 165 formed thereon to engage a ball 166 riding on another cam surface 167 formed on a driven member 168. Consequently, there is a torque transmittal between members 164 and 168; and simultaneously, an axial separating force is generated between members 164 and 168, the force being directly proportional to the torque.

Obviously, many modifications may be made without departing from the basic spirit of the present invention; and accordingly, within the scope of the appended claims, the invention may be practiced other than has been specifically described.

I claim:

1. In a tool which is operative from a source of a working medium under pressure, wherein a driving means is activated by the source to impart a torque to a driven means, predetermined torque control means comprising:
   (a) a co-engaging pair of members normally in sealing engagement with each other, one of said members being associated with the driving means, and the other with the driven means;
   (b) sensing means proportional to the torque imparted by the driving means to the driven means to generate a force tending to separate said members;
   (c) means generating a counterforce tending to maintain said members in sealing engagement with each other;
   (d) a pressurized conduit leading from said members and communicating with the source, whereby the pressure in said conduit drops whenever said members separate at the predetermined torque; and
   (e) valvular means responsive to a drop in pressure in said conduit to disconnect the driving means from the source.

2. In a tool which is operative from a source of a working medium under pressure, the combination of:
   (a) driving means activated by the source;
   (b) a main conduit leading to said driving means;
   (c) an auxiliary conduit in the device;
   (d) said auxiliary conduit being normally closed internally of the device and being in communication with the source when the tool is inoperative;
   (e) a primary valve in said main conduit;
   (f) said primary valve being initially engaged to isolate a quantity of the working medium in said auxiliary conduit, thereby pressurizing said auxiliary conduit; and said primary valve thereafter being actuated to admit a continuous supply of the working medium under pressure to said main conduit, thereby activating said driving means;
   (g) a secondary valve having at least a portion thereof in said main conduit;
   (h) said secondary valve being responsive to a drop in pressure in said isolated auxiliary conduit to close off the supply of the working medium to said main conduit, whereby said driving means is disconnected from the source at a predetermined torque; and
   (i) means responsive to the torque being supplied by said driving means to cause a pressure drop in said isolated auxiliary conduit at the predetermined torque.

3. In a tool which is operative from a source of a working medium under pressure, wherein the tool includes driving means and driven means, and wherein the driving means is activated by the source to impart a torque to the driven means, predetermined torque control means comprising:
   (a) an auxiliary conduit in the tool;
   (b) said auxiliary conduit normally being closed internally of the tool, and said auxiliary conduit further being in communication with the source when the tool is inoperative;
   (c) means to isolate a quantity of the working medium under pressure in said auxiliary conduit upon actuation of the driving means;
   (d) sensing means proportional to the torque imparted by the driving means to the driven means and tending to open said auxiliary conduit;
   (e) adjustable counteracting means tending to maintain said auxiliary conduit closed; and
   (f) valvular means responsive to a drop in pressure in said auxiliary conduit to deactivate the driving means; whereby at the predetermined torque, said sensing means overcomes said adjustable counteracting means, thereby causing said auxiliary conduit to open sufficiently, and thereby causing said valvular means to deactivate the driving means.

4. In a tool, the combination of:
   (a) a driving member having a bore;
   (b) said bore including at least a portion thereof provided with an internal helical spline;
   (c) a driven member having a cylindrical portion provided with an external helical spline;
   (d) a pair of abutting surfaces on said members, one on said driving member and the other on said driven member;
   (e) said cylindrical portion of said driven member being received within said bore of said driving member, whereby said abutting surfaces contact each other, and whereby said respective internal and external helical splines engage each other, thereby coupling said driving member to said driven member for rotation in unison, and thereby generating an axial force tending to separate said pair of abutting surfaces;
   (f) adjustable means generating a predetermined counterforce tending to maintain said abutting surfaces in contact with each other; and
   (g) means including an air conduit between said members and responsive to a separation of said abutting surfaces to stop said driving member at a predetermined torque between said driving and driven members.

5. In combination with driving means supplying a torque to driven means, wherein the driving and driven means are constantly in rotative engagement with each other, torque control means comprising:
   (a) sensing means to generate a force substantially proportional to the torque between the driving and driven means;
   (b) adjustable means including a resilient member for generating a predetermined counterforce opposing the force generated by said sensing means; and
   (c) responsive means including an air conduit between the driving and driven means to stop the driving means whenever the force generated by said sensing means exceeds the predetermined counterforce generated by said adjustable means.

6. In combination with a motor, predetermined torque control means comprising:
   (a) a driving member coupled to the motor;
   (b) a driven member receiving a torque from said driving member;
   (c) said driving and driven members being constantly in rotative engagement with each other;

(d) sensing means to generate a force substantially proportional to the torque between said driving and driven members;

(e) adjustable means including a resilient member for generating a predetermined counterforce opposing the force generated by said sensing means; and (f) responsive means including an air conduit between said members to stop the motor whenever the force generated by said sensing means exceeds the predetermined counterforce of said adjustable means.

7. In a rotary power tool which is operative from a source of compressed air, wherein the tool includes driving and driven means, and wherein the driving means is activated by the source to impart a torque to the driven means, predetermined torque control means comprising:

(a) a co-engaging pair of members, one of which is associated with the driving means and the other of which is associated with the driven means, said members having respective abutting surfaces normally in sealing engagement with each other;

(b) means proportional to the torque imparted by the driving means to the driven means to generate a force tending to separate said abutting surfaces;

(c) means generating a counterforce tending to maintain said abutting surfaces in sealing engagement with each other;

(d) a main air conduit leading to the driving means;

(e) an auxiliary air conduit leading to said abutting surfaces;

(f) a primary valve in said main air conduit;

(g) said primary valve initially being engaged to isolate a quantity of compressed air in said auxiliary air conduit, and said primary valve thereafter being engaged to admit a constant flow of compressed air to said main air conduit, thereby activating the driving means; and (h) a secondary valve having at least a portion thereof in said main air conduit;

(i) said secondary valve being responsive to a drop in pressure in said auxiliary air conduit, whereby said abutting surfaces separate at the predetermined torque to communicate said pressurized isolated auxiliary air conduit to atmosphere, and whereby said secondary valve thereafter closes off said main air conduit to stop the driving means.

8. Torque control means as defined in claim 7, wherein:

(a) one of said members comprises a driving member having a flat forward face and further having an axial bore terminating at said face with internal helical splines formed therein; and wherein:

(b) the other of said members comprises a driven member having a cylindrical portion with external helical splines formed thereon and further having a collar formed forwardly of said cylindrical portion;

(c) said collar having a rearward flat face and said cylindrical portion being received within said axial bore of said one of said members, whereby said respective faces of said members normally abut against each other and comprise said respective abutting surfaces, and whereby an axial force is generated by said helical splines tending to separate said members.

9. Torque control means as defined in claim 7, wherein said means generating a counterforce tending to maintain said abutting surfaces in sealing engagement with each other is made adjustable and comprises:

(a) an annular member rotatably mounted upon said driving member;

(b) a hollow cylindrical member rotatably mounted upon said driven member;

(c) means to couple said annular member to said hollow cylindrical member for rotation in unison;

(d) a hollow cylindrical body member mounted upon said annular member and disposed concentrically about said hollow cylindrical member;

(e) said body member having a counterbored portion provided with internal threads;

(f) said annular member having corresponding external threads to engage said internal threads of said body member;

(g) said hollow cylindrical member having a rearward shoulder;

(h) resilient means comprising a plurality of Belleville springs in said counterbored portion of said body member, said springs being between said body member and said rearward shoulder of said hollow cylindrical member;

(i) means to axially advance or retract said body member with respect to said hollow cylindrical member, thereby varying the tension exerted by said springs; and (j) locking means to preclude an inadvertent shift of said body member.

10. Torque control means as defined in claim 9, wherein said means to axially advance or retract said body member with respect to said hollow cylindrical member comprises:

(a) a series of external longitudinal splines formed on said hollow cylindrical member, said splines being forwardly of said rearward shoulder on said hollow cylindrical member;

(b) said body member having a pair of transverse openings;

(c) said transverse openings being disposed diametrically opposite from one another and being angled oppositely from one another; and (d) an adjusting key adapted to be inserted in either of said openings:

(e) said adjusting key having right-hand worm threads formed thereon to engage said splines, said worm threads having a helix angle which is substantially equal to the angle of said openings, whereby said adjusting key may be manually rotated to rotate said hollow cylindrical member, thereby rotating said annular member, and thereby axially advancing or retracting said body member with respect to said hollow cylindrical member.

11. Torque control means as defined in claim 9, wherein said locking means comprises:

(a) a locking collar slidably fitted over a portion of said body member;

(b) said locking collar having a forward flanged portion provided with internal longitudinal splines to engage said external longitudinal splines of said hollow cylindrical member;

(c) said locking collar normally covering said transverse openings in said body member;

(d) keying means between said locking collar and said body member, thereby to circumferentially orientate said locking collar with said body member; and (e) manually-manipulatable detent means between said locking collar and said body member.

12. In a portable pneumatically-operated rotary power tool, the combination of:

(a) a motor housing including a pendant handle housing;

(b) a pneumatic motor in said motor housing;

(c) a clutch housing secured forwardly of said motor housing;

(d) an end cap secured rearwardly of said motor housing;

(e) a driving member journaled in said clutch housing and coupled to said motor;

(f) a driven member rotatably coupled to said driving member and extending beyond said clutch housing;

(g) said members having respective abutting surfaces normally in air-sealing engagement with each other;

(h) means to generate an axial force tending to separate said abutting surfaces, the force being proportional to the torque transmitted from said driving member to said driven member;
(i) adjustable means generating a counterforce tending to maintain said abutting surfaces in air-sealing engagement with each other;
(j) valvular means in said pendant handle housing;
(k) a main air conduit from said valvular means to said motor;
(l) an auxiliary air conduit from said valvular means to said abutting surfaces;
(m) said auxiliary air conduit being pressurized and isolated during the operation of the tool; and
(n) said valvular means being responsive to a drop in pressure in said auxiliary air conduit to close off said main air conduit, whereby at the predetermined torque, said abutting surfaces separate to cause a pressure drop in said auxiliary air conduit, thereby causing said valvular means to stop said motor.

13. The combination according to claim 12, wherein said auxiliary air conduit from said valvular means to said abutting surfaces comprises:
(a) a blind axial bore formed in said driven member;
(b) said driven member being coaxially received within said driving member;
(c) said driven member having a plurality of radial passageways communicating said bore with said abutting surfaces;
(d) a tube received in said bore and passing longitudinally through said clutch housing and said motor housing and received rearwardly in said end cap, said tube passing through said motor axially thereof;
(e) means to support said tube forwardly in air-sealing engagement within said driven member;
(f) said end cap having a first annular recess formed coaxially with respect to said tube;
(g) means to support said tube rearwardly in air-sealing engagement within said first annular recess of said end cap;
(h) said end cap having a second annular recess formed therein rearwardly of said first annular recess and axially adjacent thereto, said second annular recess having a smaller diameter than said first annular recess;
(i) said end cap further having a pair of canals leading from said second annular recess to said motor housing;
(j) an internal core formed within said motor housing;
(k) said internal core running substantially longitudinally of said pendant handle portion of said motor housing;
(l) said motor housing having a longitudinal passageway communicating said internal core with said canals in said end cap;
(m) said pendant handle housing having a bore to receive said valvular means; and
(n) said pendant handle housing further having an annular recess communicating said valvular means with said internal core.

14. Torque control means for a power tool, comprising:
(a) driving means including a rotating driving shaft;
(b) a rotatable driven spindle;
(c) coupling means between said shaft and said spindle, whereby said shaft and said spindle rotate in unison;
(d) said coupling means generating a force tending to axially move said shaft and said spindle relative to one another, the force being proportional to the torque therebetween;
(e) means including a resilient member for generating a counterforce tending to maintain the relative axial positions of said shaft and said spindle;
(f) a pressurized isolated air conduit communicating with the atmosphere upon the relative axial movement between said shaft and said spindle; and
(g) means responsive to the release of pressure in said conduit to stop said driving means at the predetermined torque.

15. Torque control means is defined in claim 14, wherein:
(a) said shaft and said spindle are coaxially disposed within one another; and wherein:
(b) said coupling means comprises a helical spline formation between said shaft and said spindle.

16. Torque control means as defined in claim 14, wherein:
(a) said shaft and said spindle have respective axes which are perpendicular to each other; and wherein:
(b) said coupling means comprises a pair of interengaging bevel gears carried respectively on said shaft and said spindle.

17. Torque control means as defined in claim 14, wherein:
(a) said shaft and said spindle are axially aligned with one another; and wherein:
(b) said coupling means comprises a pair of cam surfaces formed respectively on the ends of said shaft and said spindle and a ball riding therebetween.

18. In a rotary power tool having a pneumatic motor which is operative from a source of compressed air, the combination of:
(a) a valve bushing;
(b) a secondary valve slidably received in said valve bushing;
(c) said secondary valve having a bore formed therein;
(d) a primary valve slidably received in said bore of said secondary valve;
(e) air-sealing means between said primary valve and said secondary valve;
(f) said primary valve extending fore and aft beyond said secondary valve;
(g) said primary valve having a bore formed therein;
(h) a seat formed for said primary valve between it and said secondary valve;
(i) a main air conduit leading to the pneumatic motor;
(j) said primary valve seat being intermediate said main air conduit and the source of compressed air;
(k) means to constantly urge said primary valve upon its seat to normally close off said main air conduit;
(l) a seat formed for said secondary valve;
(m) said secondary valve seat being intermediate said main air conduit and said primary valve seat;
(n) said secondary valve normally bieng off of its seat;
(o) an auxiliary air conduit formed in the tool;
(p) said auxiliary air conduit being formed near the end of said primary valve which is opposite from said primary valve seat;
(q) said auxiliary air conduit initially being in communication with the bore of said primary valve and, through said bore, in communication with the source of compressed air;
(r) trigger means sequentially operable to first close off said bore of said primary valve and isolate and pressurize said auxiliary air conduit, and secondly to move said primary valve with respect to said secondary valve, thereby unseating said primary valve and admitting a constant flow of compressed air to said main air conduit leading to the pneumatic motor;
(s) said secondary valve thereafter being responsive to a bleed off of air in said isolated auxiliary air conduit to move said secondary valve upon its seat, thereby closing off the supply of compressed air to said main air conduit;
(t) a pair of abutting surfaces formed within the tool;
(u) said abutting surfaces normally being in air-sealing engagement with each other;
(v) said auxiliary air conduit communicating with said abutting surfaces;
(w) means proportional to the torque delivered by the tool to generate a force tending to separate said abutting surfaces; and (x) means generating a counterforce tending to maintain said abutting surfaces in air-sealing engagement with each other, whereby, at the predetermined torque, said abutting surfaces separate to bleed off a sufficient quantity of compressed air in said isolated auxiliary air conduit, thereby causing said secondary valve to close off said main air conduit to stop the motor.

19. Torque control means for a pneumatic nut-runner, comprising:
(a) a housing;
(b) a shaft journaled in said housing;
(c) driving means to rotate said shaft;
(d) said shaft having a slight axial movement rearwardly of said housing;
(e) a first bevel gear carried by said shaft;
(f) a spindle journaled for rotation along an axis transversely of said shaft;
(g) a second bevel gear carried by said spindle and meshing with said first bevel gear, whereby the rotation of said shaft is transmitted to said spindle, and whereby an axial force is generated tending to move said shaft rearwardly;
(h) a first abutting member having a seal face;
(i) a second abutting member having a corresponding seal face normally in air-sealing engagement with said seal face of said first abutting member;
(j) a pressurized auxiliary air conduit formed in said housing and communicating with said seal faces;
(k) said seal faces separating upon the rearward axial movement of said shaft to release said auxiliary air conduit to atmosphere;
(l) means for generating a counterforce tending to maintain said seal faces in air-sealing engagement with each other; and
(m) valvular means responsive to a drop in pressure in said auxiliary air conduit to stop said driving means, whereby, at the predetermined torque, said shaft moves axially against the counterforce generated by said last-named means, and whereby said seal faces separate to release the pressure in said auxiliary air conduit, thereby causing said valvular means to stop said driving means.

20. Torque control means as defined in claim 19, wherein:
(a) said first abutting member comprises a first annular member loosely mounted upon said shaft;
(b) said first annular member being in air-sealing engagement with said housing;
(c) said first annular member having a counterbore; and wherein
(d) said second abutting member comprises a second annular member received in air-sealing engagement within said counterbore of said first annular member;
(e) said second annular member being loosely mounted on said shaft rearwardly of said first annular member.

21. Torque control means as defined in claim 19, wherein said means for generating a counterforce tending to maintain said seal faces in air-sealing engagement with each other is adjustable and comprises:
(a) retaining means positioned on said shaft rearwardly of said second abutting member;
(b) first thrust bearing means between said second abutting member and said retaining means;
(c) resilient means positioned on said shaft forwardly of said first abutting member;
(d) second thrust bearing means between said resilient means and said first abutting member;
(e) an adjusting nut threadably received upon said shaft forwardly of said resilient means; and
(f) means to axially advance or retract said adjusting nut along said shaft, thereby varying the tension of said resilient means, and thereby varying the counterforce tending to maintain said seal faces in air-sealing engagement with each other.

22. A torque-controlled pneumatic nut-runner operative from a source of compressed air and comprising, in combination:
(a) a cylindrical motor housing;
(b) a pneumatic motor in said motor housing;
(c) a handle housing secured rearwardly of said motor housing;
(d) a shaft housing secured forwardly of said motor housing;
(e) an angle-head housing forwardly of said motor housing;
(f) a shaft journaled for rotation in said shaft housing;
(g) a first bevel gear carried by said shaft;
(h) a spindle journaled for rotation in said angle-head housing along an axis transverse to the axis of said shaft;
(i) a second bevel gear carried by said spindle and meshing with said first bevel gear carried by said shaft, whereby the rotation of said shaft is transmitted to said spindle, and whereby an axial force is generated tending to move said shaft rearwardly;
(j) means to couple said shaft to said motor for rotation in unison, said means allowing said shaft to have a slight axial movement rearwardly of said shaft housing;
(k) a first abutting member in said shaft housing;
(l) said first abutting member having a seal face;
(m) a second abutting member in said shaft housing;
(n) said second abutting member having a corresponding seal face normally in air-sealing engagement with said seal face of said first abutting member;
(o) valvular means in said handle housing; said valvular means controlling the supply of compressed air to said motor;
(p) an auxiliary air conduit leading from said valvular means and communicating with said seal faces, said auxiliary air conduit being normally pressurized and isolated during the operation of the nut-runner;
(q) said seal faces separating upon the rearward axial movement of said shaft to release said auxiliary air conduit to atmosphere;
(r) adjustable means for generating a counterforce tending to maintain said seal faces in air-sealing engagement with each other; and
(s) said valvular means being responsive to a drop in pressure in said auxiliary air conduit to stop the supply of compressed air to said motor, whereby, at a predetermined torque, said shaft moves axially against the counterforce generated by said adjustable means, thereby causing said seal faces to separate to release said auxiliary air conduit, and thereby causing said valvular means to stop said motor.

23. Torque control means for a power tool, comprising, in combination:
(a) a pair of torque-responsive members comprising a driving member and a driven member having relative movement therebetween at the predetermined point of torque release;
(b) a pressurized conduit, normally isolated during the operation of the tool, and communicating with the atmosphere in accordance with the relative movement between said members; and
(c) valvular means responsive to a change in pressure in said conduit to shut off the tool at the predetermined torque.

24. Torque control means for a pneumatic tool, comprising:
(a) a housing;
(b) a pneumatic motor in said housing;
(c) a driving member powered by said motor;
(d) a driven member;

(e) means coupling said driven member to said driving member for conjoint rotation, said means generating an axial force tending to separate said members;

(f) a pair of abutting seal surfaces, one each associated with a respective one of said members, and separating one from another upon the separation of said members;

(g) means constantly urging said abutting surfaces together;

(h) an auxiliary air conduit formed within the housing and communicating with said abutting surfaces;

(i) a main air conduit formed in the tool and communicating said pneumatic motor with the source of compressed air;

(j) a manually-manipulatable primary valve in said main air conduit to control said motor;

(k) means to isolate a quantity of compressed air in said auxiliary air conduit during the operation of the tool; and (l) a secondary valve having at least a portion thereof in said main air conduit and responsive to a drop in pressure in said isolated auxiliary air conduit to shut off said motor whenever said abutting surfaces separate at the predetermined point of torque release between said members.

References Cited in the file of this patent

UNITED STATES PATENTS

| | | |
|---|---|---|
| 807,384 | Keller | Dec. 12, 1905 |
| 828,374 | Blein | Aug. 14, 1906 |
| 2,099,280 | Shaff | Nov. 16, 1937 |
| 2,337,897 | Jimerson | Dec. 28, 1943 |
| 2,700,443 | Boice | Jan. 25, 1955 |
| 2,835,365 | Rice et al. | May 20, 1958 |
| 2,905,149 | Swanson | Sept. 22, 1959 |
| 2,974,553 | Donowick | Mar. 14, 1961 |
| 3,033,236 | Rayman et al. | May 8, 1962 |
| 3,048,194 | Huthsing et al. | Aug. 7, 1962 |
| 3,049,098 | Inoue | Aug. 14, 1962 |